(12) United States Patent
Lu et al.

(10) Patent No.: US 12,371,347 B1
(45) Date of Patent: Jul. 29, 2025

(54) CONNECTION STRUCTURE FOR FILTRATION DEVICE

(71) Applicant: KOROS TECHNOLOGY (SHENZHEN) CO. LTD, Shenzhen (CN)

(72) Inventors: Qiang Lu, Shenzhen (CN); Dezhen Xie, Shenzhen (CN); Defu Wu, Shenzhen (CN)

(73) Assignee: KOROS TECHNOLOGY (SHENZHEN) CO. LTD, Shenzhen (CN)

( * ) Notice: Subject to any disclaimer, the term of this patent is extended or adjusted under 35 U.S.C. 154(b) by 0 days.

(21) Appl. No.: 19/023,327

(22) Filed: Jan. 16, 2025

(30) Foreign Application Priority Data

Dec. 3, 2024 (CN) .......................... 202422973801.8

(51) Int. Cl.
*C02F 1/00* (2023.01)

(52) U.S. Cl.
CPC .............. *C02F 1/002* (2013.01); *C02F 1/003* (2013.01); *B01D 2201/4023* (2013.01); *C02F 2201/004* (2013.01); *C02F 2201/006* (2013.01); *C02F 2307/12* (2013.01)

(58) Field of Classification Search
CPC .... C02F 1/002; C02F 1/003; C02F 2201/004; C02F 2201/006; C02F 2307/12; B01D 2201/4061; B01D 2201/36; B01D 2201/4007; B01D 2201/4015; B01D 2201/4023; B01D 35/306
See application file for complete search history.

(56) References Cited

U.S. PATENT DOCUMENTS

| | | | | |
|---|---|---|---|---|
| 8,999,163 | B2* | 4/2015 | Honermann | B01D 35/153 210/493.2 |
| 9,987,572 | B2* | 6/2018 | Mitchell | F25D 23/028 |
| 11,806,648 | B1* | 11/2023 | Cooper | B01D 15/30 |
| 2011/0185762 | A1* | 8/2011 | Kruckenberg | B23P 19/04 62/449 |

* cited by examiner

*Primary Examiner* — Terry K Cecil
(74) *Attorney, Agent, or Firm* — Li & Cai Intellectual Property Office

(57) ABSTRACT

A connection structure for a filtration device, which relates to the field of filter technology, includes a main shell body, a mounting section and a switch section respectively assembled at two ends of the main shell body, and an installation section. When the switch section is toggled in one direction, the switch section drives the installation section to rotate and be inserted into a mounting hole on a refrigerator, an inlet and an outlet are correspondingly connected to a refrigerator pipeline, and water flows through the filtering component to filter out impurities. By using the above technical solution, the connection failure and water leakage issues are prevented and offering simple connection operation and quick assembly.

9 Claims, 6 Drawing Sheets

CONNECTION STRUCTURE FOR FILTRATION DEVICE

FIELD OF THE DISCLOSURE

The present disclosure relates to a field of filter, and more particularly to a connection structure for a filtration device.

BACKGROUND OF THE DISCLOSURE

With the improvement of people's standard of living and increased health awareness, the demand for household water purification equipment has been steadily growing. Refrigerator water filters, as one of essential components, are widely used in both residential and commercial fields, providing users with clean and safe drinking water. However, the conventional connection methods for refrigerator water filters mainly adopt twisting, screwing, etc. Although it meets basic usage requirements to a certain extent, when the user installs the filter, the conventional twisting or screwing methods require that the user needs to properly align the threads and apply the correct amount of force to tighten them. The user often struggles to control the force accurately during the twisting process, which can result in either improper tightening or overtightening. Improper tightening can lead to loose connections, while overtightening may damage the filter or the interface. If the filter is not tightened correctly, the seal between the filter and the interface may be compromised, leading to potential leakage. Furthermore, the twisting connection method is relatively complex and does not allow for quick installation. Therefore, there is an urgent need for improvement.

SUMMARY OF THE DISCLOSURE

The purpose of the present disclosure is to provide a connection structure for a filtration device to address the shortcomings and deficiencies of the existing technology that prevents connection failure and water leakage issues. It offers the advantages of simple connection operation and quick assembly.

In order to solve the above-mentioned problems, the technical solution adopted by the present disclosure is: a connection structure of filtration device, which includes:
- a main shell body having a filtering component disposed therein;
- a mounting section assembled at one end of the main shell body, the mounting section having an inlet and an outlet;
- a switch section assembled at another end of the main shell body; and
- an installation section passing through the main shell body, one end of the installation section being fixedly assembled to the switch section and another end of the installation section extending from the mounting section;
- when the switch section is toggled in one direction, the switch section drives the installation section to rotate and be inserted into a mounting hole on a refrigerator, the inlet and the outlet are correspondingly connected to a refrigerator pipeline, and water flows through the filtering component to filter out impurities.

The present disclosure further provides that the switch section includes: a housing, a stationary shaft fixedly assembled onto the housing, a sleeve rotatably assembled onto the stationary shaft, a toggle switch arranged on the sleeve, a first gear fixedly assembled onto the sleeve, and a second gear fixedly assembled onto the installation section and engaged to the first gear.

The present disclosure further provides that the first gear and the second gear are arranged vertically; when the toggle switch is toggled, the first gear is driven to rotate in a horizontal direction, and the first gear drives the second gear to rotate in a vertical direction.

The present disclosure further provides that an inner peripheral side of the first gear is provided with a first protrusion section, and the sleeve is provided with an insertion slot for the first protrusion section to be inserted.

The present disclosure further provides that the housing is provided with a travel slot for the toggle switch to toggle back and forth.

The present disclosure further provides that a side of the toggle switch is provided with a second protrusion section, and a side of the travel slot, facing the toggle switch, is provided with a snap-fit section that is abutted against the second protrusion section.

The present disclosure further provides that a side of the snap-fit section that is abutted against the second protrusion section is defined as a snap-fit surface, and a side of the snap-fit section that is opposite to the snap-fit surface is provided with a guiding slope.

The present disclosure further provides that a bottom of the travel slot is further provided with a recessed section to facilitate toggling of the toggle switch.

The present disclosure further provides that the installation section includes: a connecting rod passing through the second gear, and an installation head fixedly assembled to an end of the connecting rod that is away from the second gear.

The present disclosure further provides that the installation head is provided with a protrusion at a connection with the interface section; the mounting section is provided with a rib in an arc shape that matches the protrusion; when the toggle switch is toggled in one direction, the protrusion is abutted against one end of the rib; when the toggle switch is toggled in another direction, the protrusion is abutted against another end of the rib.

By adopting the above technical solution, the beneficial effects of the present disclosure are as follows: In the present disclosure, by providing the main shell body, the mounting section and the switch section respectively assembled at two ends of the main shell body, and the installation section passing through the main shell body, the filtration device can be installed on the refrigerator. The switch section, located opposite to the mounting section, mainly controls a connection state of the filtration device. The inlet and outlet on the interface section, along with the filtering component within the main shell body, allow water to flow through the filtration component when the switch section is toggled in one direction. This motion directly drives the installation section to rotate and fit into the mounting hole on the refrigerator, completing the connection and installation. The inlet and outlet are correspondingly connected to the refrigerator's pipeline, and the filtering component removes impurities from the water as it passes through, providing clean and safe drinking water. When the switch section is toggled in the opposite direction, the installation section rotates and detaches from the mounting hole, causing the inlet and outlet to disconnect from the refrigerator's pipeline, enabling quick installation or removal of the filtration device. Thus, this filtration device not only effectively purifies water but also simplifies the user installation process, improving convenience. Furthermore, with simple operation, users can complete the installation and removal of the filter without additional tools, avoiding connection failure and leakage issues. In addition, the filtration device offers the advantages of easy connection and rapid assembly.

BRIEF DESCRIPTION OF THE DRAWINGS

In order to more clearly illustrate the technical solutions of the embodiments of the present disclosure or the prior art, the following provides a brief introduction to the accompanying drawings that will be used in the description of the embodiments or prior art. It is evident that the accompanying drawings described below are merely some embodiments of the present disclosure. For those skilled in the art, without inventive effort, other drawings can be derived based on these illustrations.

Figure 1:
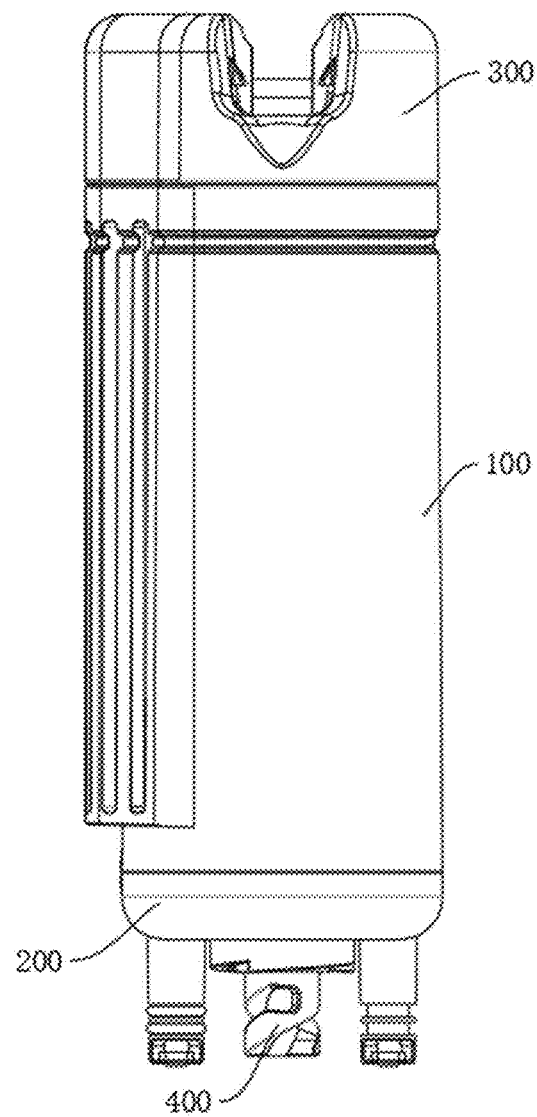
FIG. 1 is a schematic structural view of a connection structure for a filtration device.

Reference numerals: 100, main shell body; 110, filtering component; 200, mounting section; 210, inlet; 220, outlet; 230, rib; 300, switch section; 310, housing; 320, stationary shaft; 321, bump; 330, sleeve; 331, insertion slot; 340, toggle switch; 341, second protrusion section; 342, first recessed surface; 343, second recessed surface; 350, first gear; 351, first protrusion section; 360, second gear; 370, travel slot; 371, snap-fit section; 3711, snap-fit surface; 3712, guiding slope; 372, recessed section; 380, bearing; 400, installation section; 410, connecting rod; 420, installation head; 421, protrusion.

DETAILED DESCRIPTION OF THE EXEMPLARY EMBODIMENTS

The following provides a more detailed explanation of the present disclosure in conjunction with the drawings.

This specific embodiment is merely an explanation of the present disclosure and does not limit the present disclosure. After reading this specification, a person skilled in the art may make modifications to this embodiment that do not involve inventive contribution as needed. However, as long as they fall within the scope of the claims of the present disclosure they are protected by patent law.

The present embodiment relates to a connection structure for a filtration device, with reference to FIG. 1 to FIG. 4, the connection structure for the filtration device includes: a main shell body 100, a mounting section 200, a switch section 300, and an installation section 400.

The main shell body 100 is a basic structure of entire filtration device, used to accommodate the filtering component 110. The main shell body 100 provides a sealed space for the filtration process, ensuring that impurities can be effectively removed as the water flows through the filtering component 110. The mounting section 200 is arranged at one end of the main shell body 100, and equipped with an inlet 210 and an outlet 220 for connecting a water source and a target output point, allowing untreated water to enter the filtration device through the inlet 210, and the filtered clean water to flow out from the outlet 220. The switch section 300 is arranged at another end of the main shell body 100, and is primarily used to control a connection status of the filtration device. Therefore, when the switch section 300 is toggled in one direction, the switch section 300 drives the installation section 400 to rotate and be inserted into a mounting hole on a refrigerator. The inlet 210 and the outlet 220 are correspondingly connected to a refrigerator pipeline, and water flows through the filtering component 110 to filter out impurities. A user only needs to toggle the switch section 300 to complete the entire installation process, without the need for additional tools or complex screwing operations. This simplifies the installation steps, and with a simple action, the installation section 400 can be quickly and accurately rotated into the mounting hole on the refrigerator, reducing installation time. After the inlet 210 and the outlet 220 are correspondingly connected to the refrigerator pipeline correctly, the water flow can smoothly pass through the filtration device. Untreated raw water is introduced through the inlet 210, and, after being purified by the filtering component 110, flows out as clean water from the outlet 220. The filtering component 110 effectively removes impurities, suspended solids, and other contaminants from the water, providing clean and safe drinking water. Therefore, the filtration device not only effectively purifies water but also greatly simplifies the installation process for the user, enhancing ease of use. The user only needs to apply a certain amount of force to toggle the switch, without the need for additional tools, to complete the installation and removal of the filter. This design also eliminates issues such as water leakage caused by improper connections, offering the advantages of simple connection operations and quick assembly.

Figure 3:
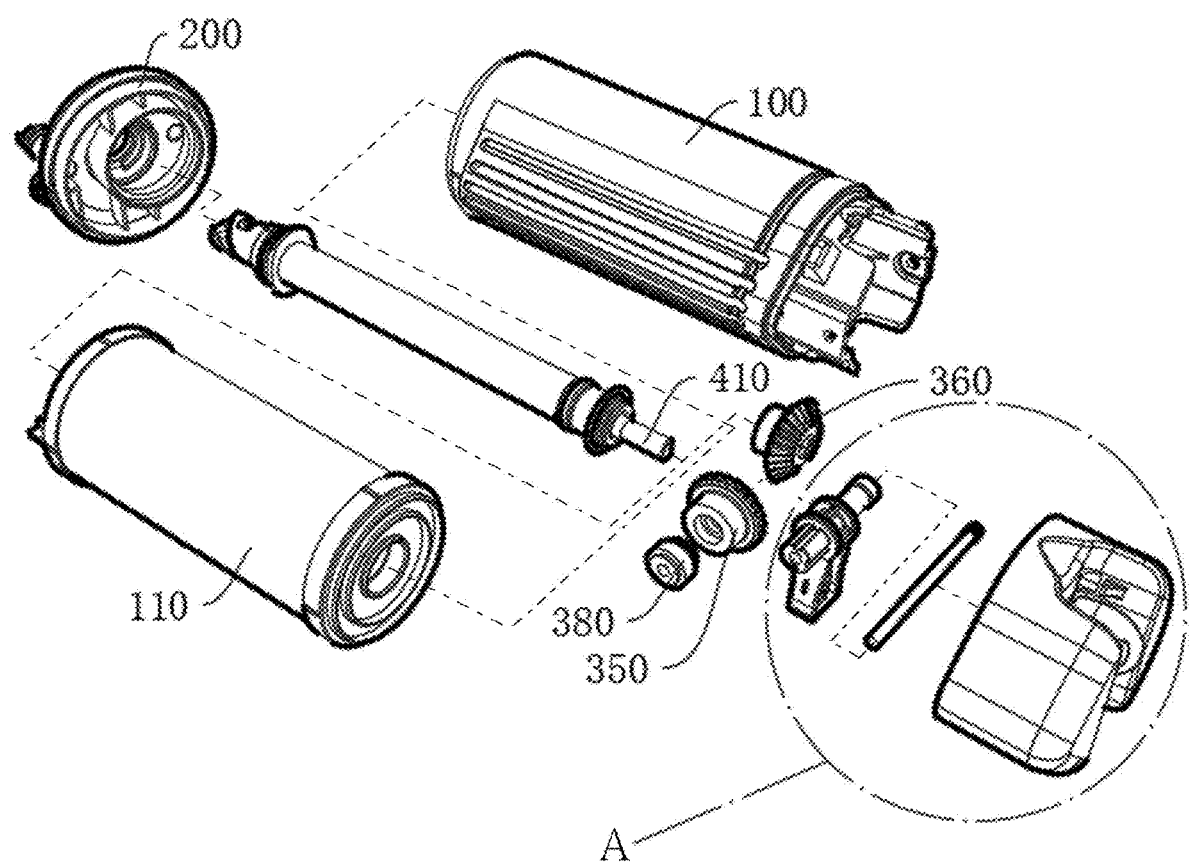
FIG. 3 is another schematic exploded view of the connection structure for the filtration device.
Figure 4:
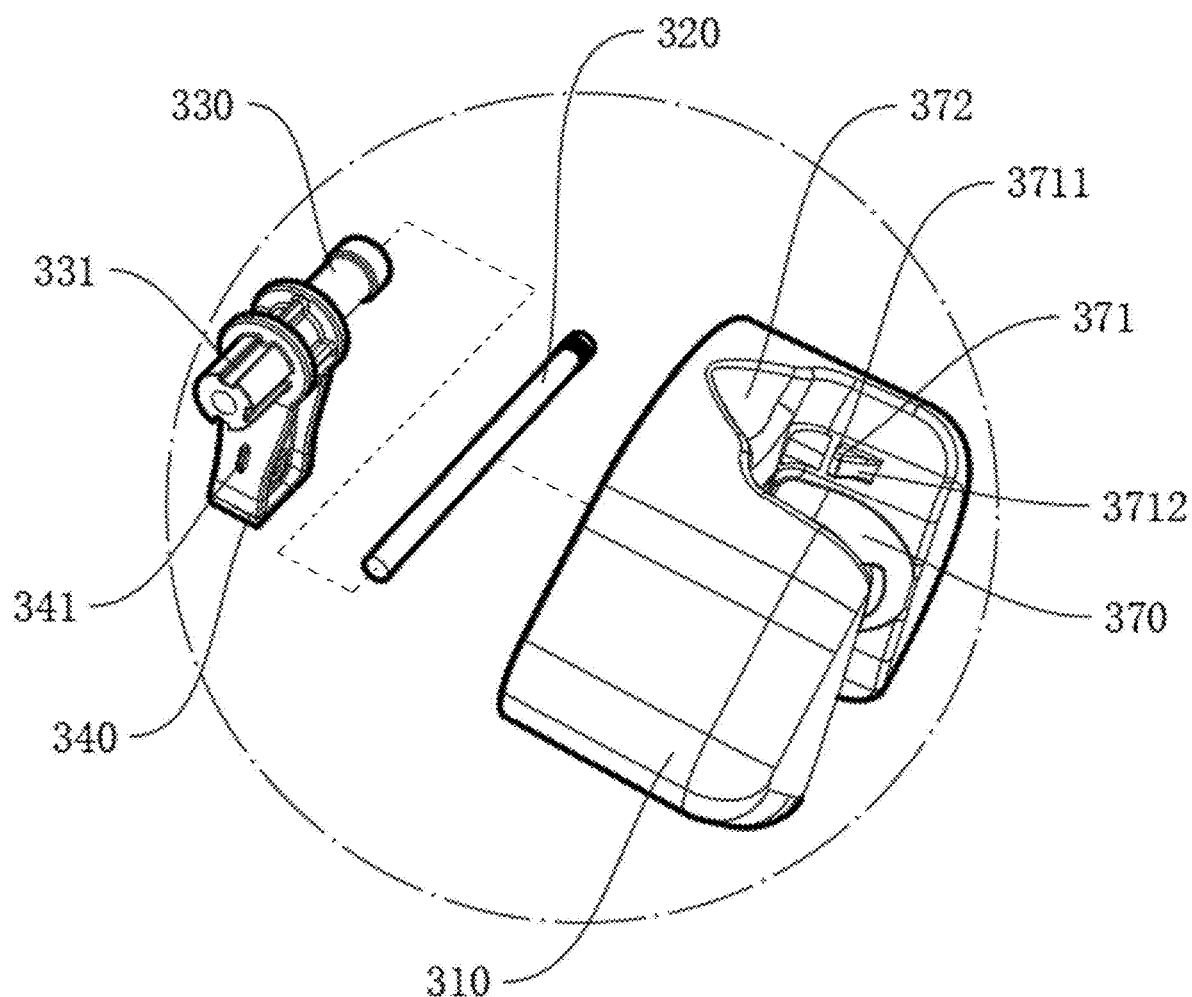
FIG. 4 a schematic enlarged view of part A in FIG. 3.
Figure 5:
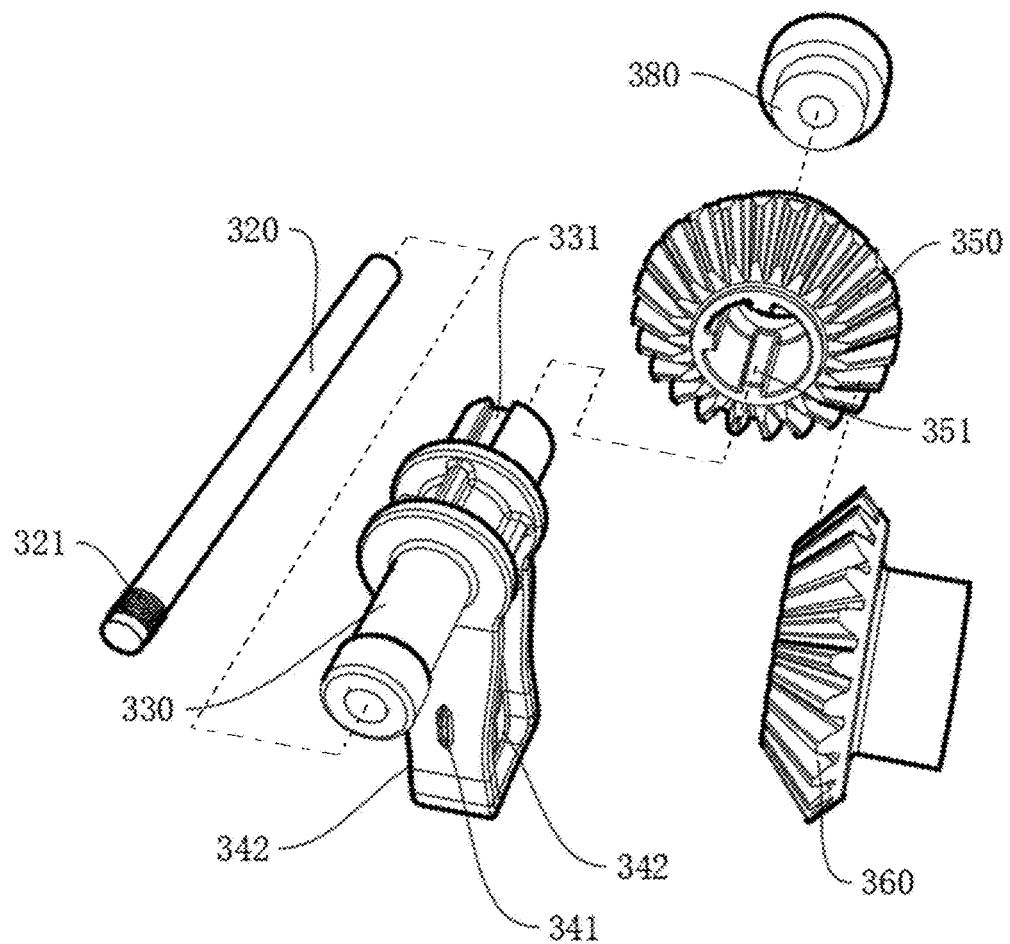
FIG. 5 is a schematic exploded view of a switch section.

In the present embodiment, with reference to FIG. 3 to FIG. 5, the switch section 300 includes: a housing 310, a stationary shaft 320, a sleeve 330, a toggle switch 340, a first gear 350, and a second gear 360. The housing 310 is used to enclose internal mechanical components, ensuring that these components are not affected or damaged by an external environment during normal operation. The stationary shaft 320 serves as a support point, allowing the sleeve 330 and the toggle switch 340 to rotate around the stationary shaft 320. Specifically, the connection between the stationary shaft 320 and the housing 310 is equipped with several bumps 321 to increase a connection strength therebetween, preventing the sleeve 330 and toggle switch 340 from loosening or rotating improperly during movement. The sleeve 330 is rotatably assembled onto the stationary shaft 320, and the toggle switch 340 is arranged on the sleeve 330. Specifically, the sleeve 330 and the toggle switch 340 are integrally formed. Therefore, when the user toggles the toggle switch 340, the manually applied force is directly transmitted to the sleeve 330, causing the sleeve 330 to rotate around the stationary shaft 320, which in turn drives the installation section 400 to rotate, thereby changing the connection state of the filtration device. The first gear 350 is fixedly mounted onto the sleeve 330, so when the toggle switch 340 is toggled, the first gear 350 rotates along with the toggle switch 340. Specifically, the switch section 300 is also equipped with a bearing 380 that is fixedly connected to the first gear 350. The second gear 360 is fixedly mounted to the installation section 400 and engaged to the first gear 350. When the first gear 350 rotates due to the toggling of the toggle switch 340, the second gear 360 is driven to rotate. Since the second gear 360 is connected to the installation section 400, the installation section 400 is driven to rotate. The installation section 400 passes through the entire main shell body 100, with one end connected to the second gear 360, and the other end extending out from the mounting section 200. When the toggle switch 340 is toggled and the rotational force is transmitted to the installation section 400 via the gear mechanism, the installation section 400 rotates and is inserted into a pre-reserved mounting hole in the refrigerator. This allows for the rapid installation or removal of the filtration device from the refrigerator, eliminating the need for twisting. As a result, issues such as improper twisting that could lead to ineffective connections and water leakages are avoided, highlighting the simplicity and convenience of this connection method.

Figure 2:
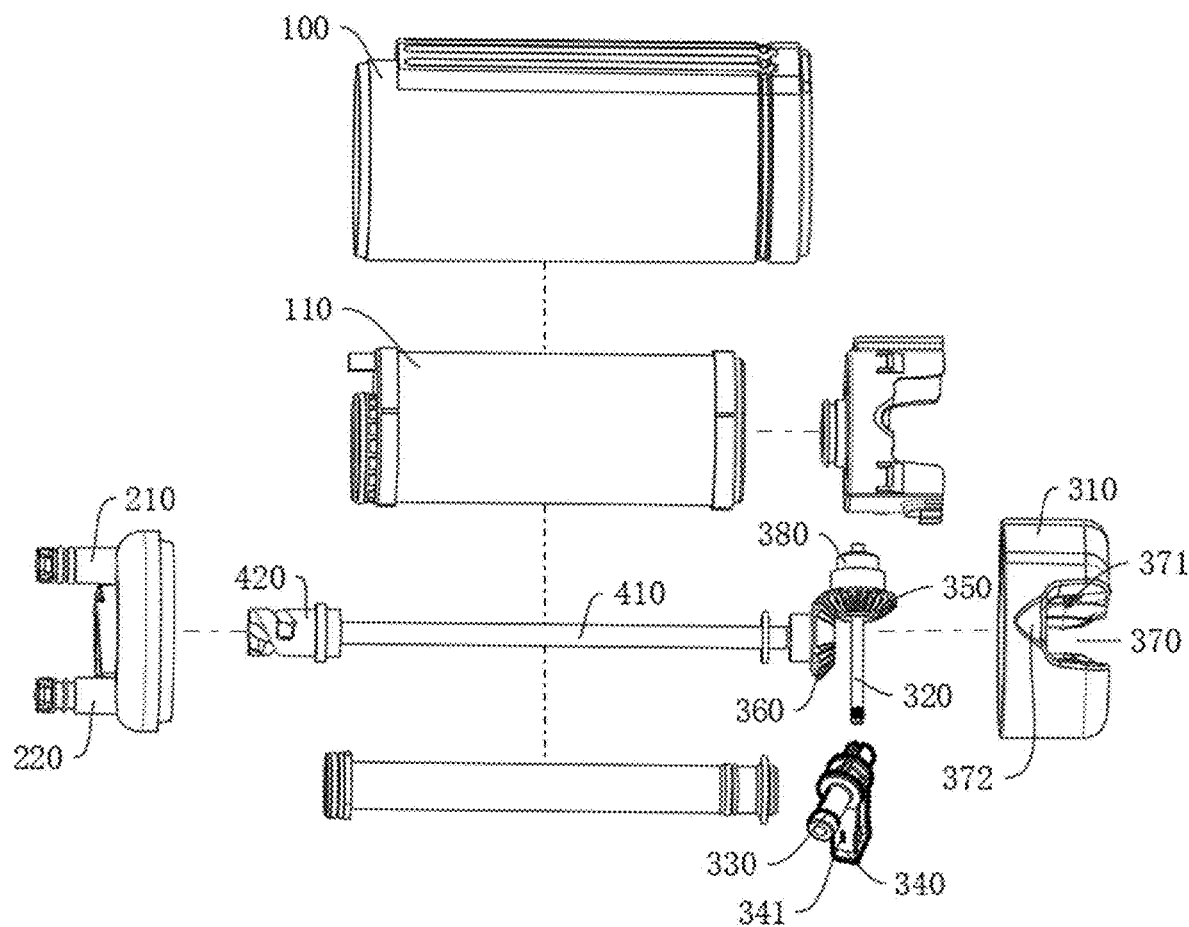
FIG. 2 is a schematic exploded view of the connection structure for the filtration device.

In the present embodiment, with reference to FIG. 2, the first gear 350 and the second gear 360 are arranged perpendicular to each other, so that rotational axes of the first gear 350 and the second gear 360 are perpendicular to each other. When the toggle switch 340 is toggled, the first gear 350 is driven to rotate in a horizontal direction. The first gear 350 then drives the second gear 360 to rotate in a vertical direction through their engagement. The horizontal force is converted into a vertical force, allowing the user to control the rotation of the installation section 400 into or out of the refrigerator's mounting hole by simply toggling the switch in a left-right or up-down direction. Additionally, by arranging the gears vertically, the components can be effectively organized within limited space, making the entire device more compact and easier to integrate into a refrigerator or other equipment. In other embodiments, a locking mechanism can be set at specific positions, ensuring that the switch can only be returned to its original position when the installation section 400 is fully in place, thus preventing accidental loosening.

In the present embodiment, with reference to FIG. 4 and FIG. 5, a peripheral side of the first gear 350 is provided with a first protrusion section 351, while the sleeve 330 is provided with an insertion slot 331 for the first protrusion section 351 to be inserted into. By inserting the first protrusion section 351 into the insertion slot 331, the first gear 350 can rotate synchronously with the sleeve 330 when the sleeve 330 rotates. This ensures that the user's operation of the toggle switch 340 can be directly and accurately transmitted to the first gear 350, thereby further driving the second gear 360 and the installation section 400 to perform the corresponding actions.

In the present embodiment, the housing 310 is provided with a travel slot 370 for the toggle switch 340 to toggle back and forth. The travel slot 370 provides a clear movement path and limits for the toggle switch 340, allowing precise control over the position change of the toggle switch 340, thereby accurately adjusting the installation or removal action of the filtration device.

In the present embodiment, with reference to FIG. 2 to FIG. 4, a side of the toggle switch 340 is provided with a second protrusion section 341, and a side of the travel slot 370 facing the toggle switch 340 is equipped with a snap-fit section 371 that is abutted against the second protrusion section 341. When the toggle switch 340 moves to a specific position, the second protrusion section 341 will contact and be locked with the snap-fit section 371, ensuring that the toggle switch does not easily move out of the set position. Specifically, when the second protrusion section 341 contacts the snap-fit section 371, the user can feel a noticeable resistance or hear a "click" sound, providing tactile feedback to indicate that the operation is complete and in the correct position. This feedback signal helps confirm that the toggle switch 340 has been correctly moved to the preset position, ensuring that the mounting portion is securely fastened to the refrigerator's mounting hole and preventing water leakage. In addition, the snap-fit section 371 effectively prevents the toggle switch 340 from accidentally sliding due to vibration, accidental touch, or other factors, thereby avoiding connection failure and preventing water leakage issues.

In the present embodiment, with reference to FIG. 4, a side of the snap-fit section 371 that is abutted against the second protrusion section 341 is provided with a snap-fit surface 3711, and a side of the snap-fit section 371 that is opposite to the snap-fit surface 3711 is provided with a guiding slope 3712. The snap-fit surface 3711 ensures that when the toggle switch 340 moves to a specific position, the second protrusion section 341 can securely contact the snap-fit surface 3711, further preventing the toggle switch 340 from accidentally sliding due to external forces or vibration. The guiding slope 3712 helps guide the second protrusion section 341 smoothly into the locking position, reducing resistance during the operation. It also prevents the second protrusion section 341 from directly impacting the snap-fit section 371, thereby reducing wear between the two components. In other embodiments, a layer of lubricant can be applied to a surface of the guiding slope 3712, further reducing friction and minimizing wear between the components.

In the present embodiment, a bottom of the travel slot 370 is also provided with a recessed section 372 to facilitate the toggling of the toggle switch 340. The recessed section 372 provides extra space for the user's fingers, making it easier for the user to grip and toggle the toggle switch 340.

Specifically, in this embodiment, with reference to FIG. 5, the toggle switch 340 is provided with a first recessed surface 342 on an upper side and a second recessed surface 343 on a lower side, offering better gripping or force application points for the user's fingers, making it easier and more comfortable to toggle the switch. More specifically, the first recessed surface 342 is marked with a locking state symbol (not shown), and the second recessed surface 343 is marked with an unlocking state symbol (not shown). In other embodiments, the first recessed surface 342 can also represent the unlocking state, while the second recessed surface 343 can indicate the locking state, but the present disclosure is not limited thereto.

Figure 6:
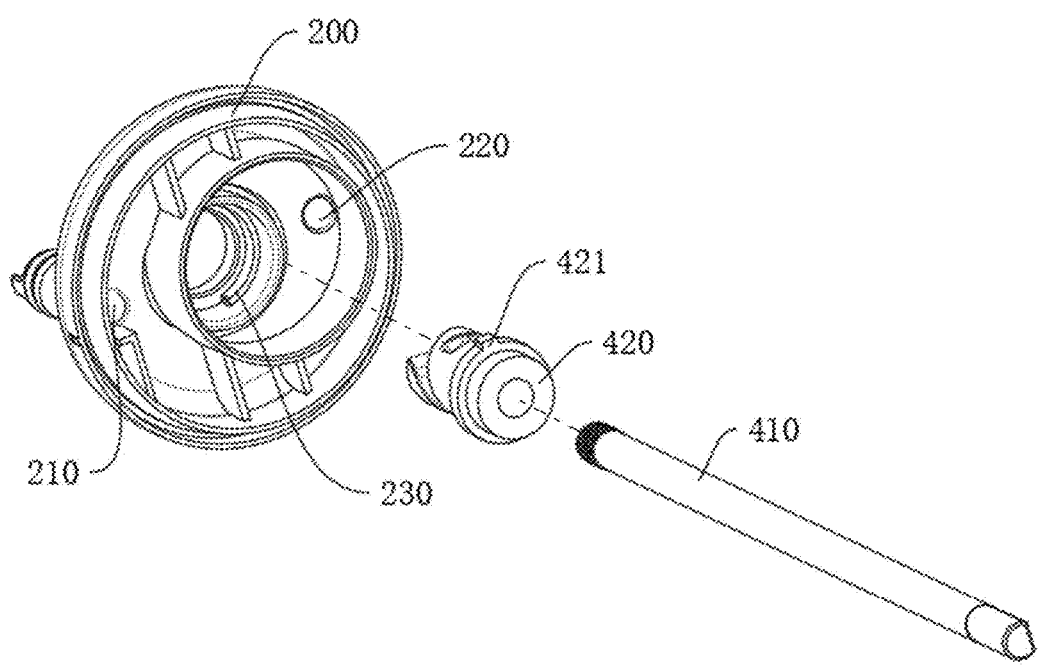
FIG. 6 is a schematic exploded view of a mounting section and an installation section.

In the present embodiment, with reference to FIG. 6, the installation section 400 includes: a connecting rod 410 passing through the second gear 360 and an installation head 420 fixedly connected to at an end of the connecting rod 410 that is far from the second gear 360. Specifically, a connection between the connecting rod 410 and the installation head 420 is provided with several bumps (not shown), which strengthen the connection between the two components. The connecting rod 410 passes through the second gear 360 and is fixedly connected to the second gear 360. When the second gear 360 rotates, the connecting rod 410 is driven to rotate as well. The connecting rod 410, as a key component for transmitting torque, ensures smooth movement between the switch component and the installation head 420. The installation head 420 is shaped to be insertable into the pre-reserved hole in the refrigerator (such as a thread, snap-fit, etc.). Through the rotation of the connecting rod 410, the installation head 420 can be screwed in or out of the refrigerator's mounting hole, allowing for the rapid installation or removal of the filtration device.

In the present embodiment, with reference to FIG. 6, at the connection between the installation head 420 and the mounting section 200, a protrusion 421 is formed outward. The mounting section 200 has an arc-shaped rib 230 that matches the protrusion 421. When the toggle switch 340 is toggled in one direction, it causes the protrusion 421 to be abutted against one end of the rib 230. When the toggle switch 340 is toggled in the opposite direction, the protrusion 421 is abutted against the other end of the rib 230. The interaction between the protrusion 421 and the rib 230 ensures that when the toggle switch 340 is toggled in different directions, the protrusion 421 slides and eventually stops at both ends of the rib 230, thereby limiting the rotation of the installation head 420 to a specific angular range. This precisely controls the movement of the installation head 420, preventing it from rotating beyond the predetermined position when being screwed into the mounting hole. This helps avoid poor sealing caused by over-tightening or under-tightening, preventing potential water leakage issues.

The above is provided solely for illustrating the technical solutions of the present disclosure and is not intended to limit them. Any other modifications or equivalent substitutions made by those skilled in the art to the technical solutions of the present disclosure, as long as they do not depart from the spirit and scope of the present disclosure, should fall within the scope of the claims of the present disclosure.

What is claimed is:

1. A connection structure for a filtration device, comprising:
   a main shell body (100) having a filtering component (110) disposed therein;
   a mounting section (200) assembled at one end of the main shell body (100), the mounting section (200) having an inlet (210) and an outlet (220);
   a switch section (300) assembled at another end of the main shell body (100); and
   an installation section (400) passing through the main shell body (100), one end of the installation section (400) being fixedly assembled to the switch section (300) and another end of the installation section (400) extending from the mounting section (200);
   wherein, when the switch section (300) is toggled in one direction, the switch section (300) drives the installation section (400) to rotate and be inserted into a mounting hole on a refrigerator, the inlet (210) and the outlet (220) are correspondingly connected to a refrigerator pipeline, and water flows through the filtering component (110) to filter out impurities, and
   wherein the switch section (300) includes: a housing (310), a stationary shaft (320) fixedly assembled onto the housing (310), a sleeve (330) rotatably assembled onto the stationary shaft (320), a toggle switch (340) arranged on the sleeve (330), a first gear (350) fixedly assembled onto the sleeve (330), and a second gear (360) fixedly assembled onto the installation section (400) and engaged to the first gear (350).

2. The connection structure for the filtration device according to claim 1, wherein the first gear (350) and the second gear (360) are arranged vertically; wherein, when the toggle switch (340) is toggled, the first gear (350) is driven to rotate in a horizontal direction, and the first gear (350) drives the second gear (360) to rotate in a vertical direction.

3. The connection structure for the filtration device according to claim 1, wherein an inner peripheral side of the first gear (350) is provided with a first protrusion section (351), and the sleeve (330) is provided with an insertion slot (331) for the first protrusion section (351) to be inserted.

4. The connection structure for the filtration device according to claim 1, wherein the housing (310) is provided with a travel slot (370) for the toggle switch (340) to toggle back and forth.

5. The connection structure for the filtration device according to claim 4, wherein a side of the toggle switch (340) is provided with a second protrusion section (341), and a side of the travel slot (370) facing the toggle switch (340) is provided with a snap-fit section (371) that is abutted against the second protrusion section (341).

6. The connection structure for the filtration device according to claim 5, wherein a side of the snap-fit section (371) that is abutted against the second protrusion section (341) is provided with a snap-fit surface (3711), and a side of the snap-fit section (371) that is opposite to the snap-fit surface (3711) is provided with a guiding slope (3712).

7. The connection structure for the filtration device according to claim 4, wherein a bottom of the travel slot (370) is further provided with a recessed section (372) to facilitate toggling of the toggle switch (340).

8. The connection structure for the filtration device according to claim 1, wherein the installation section (400) includes: a connecting rod (410) passing through the second gear (360), and an installation head (420) fixedly assembled to an end of the connecting rod (410) that is away from the second gear (360).

9. The connection structure for the filtration device according to claim 8, wherein the installation head (420) is provided with a protrusion (421) at a connection with the mounting section (200); the mounting section (200) is provided with a rib (230) in an arc shape that matches the protrusion (421); wherein, when the toggle switch (340) is toggled in one direction, the protrusion (421) is abutted against one end of the rib (230); when the toggle switch (340) is toggled in another direction, the protrusion (421) is abutted against another end of the rib (230).

* * * * *